United States Patent [19]

Geniès

[11] 4,455,014
[45] Jun. 19, 1984

[54] PRODUCTION OF REFRACTORY LININGS OR WALLS

[75] Inventor: Bernard Geniès, Orsay, France

[73] Assignee: L'Air Liquide, Societe Anonyme pour l'Etude et l'Exploitation, Paris, France

[21] Appl. No.: 448,833

[22] Filed: Dec. 10, 1982

[30] Foreign Application Priority Data

Dec. 15, 1981 [FR] France .............................. 81 23364

[51] Int. Cl.$^3$ ............................................... C21C 7/00
[52] U.S. Cl. ..................................... 266/44; 266/281; 266/286
[58] Field of Search ................. 266/281, 286, 44, 901; 75/46; 264/30; 432/224, 225

[56] References Cited

U.S. PATENT DOCUMENTS

| | | | |
|---|---|---|---|
| 3,947,002 | 3/1976 | Frech et al. | 266/281 |
| 4,218,050 | 8/1980 | Egli et al. | 266/281 |
| 4,223,873 | 9/1980 | Battles | 266/281 |
| 4,364,729 | 12/1982 | Fresch | 266/44 |

FOREIGN PATENT DOCUMENTS

| | | | |
|---|---|---|---|
| 2377595 | 11/1978 | France . | |
| 449739 | 7/1936 | United Kingdom | 266/281 |

Primary Examiner—L. Dewayne Rutledge
Assistant Examiner—S. Kastler
Attorney, Agent, or Firm—Lee C. Robinson, Jr.

[57] ABSTRACT

This invention relates to the production of refractory linings. According to the method, the lining formed by refractory materials is heated to a temperature sufficient to cause the sintering of the materials on at least an internal surface of the said lining. To provide this heating action, a flame is produced from a fuel gas and oxygen, within a partially closed volume close to the lining which is to be sintered, and a diluting gas is injected between the flame and the lining, at least during the first part of the rise in temperature. The method is applicable to the sintering of the linings of vessels utilized in metallurgy, in particular of induction furnaces.

22 Claims, 3 Drawing Figures

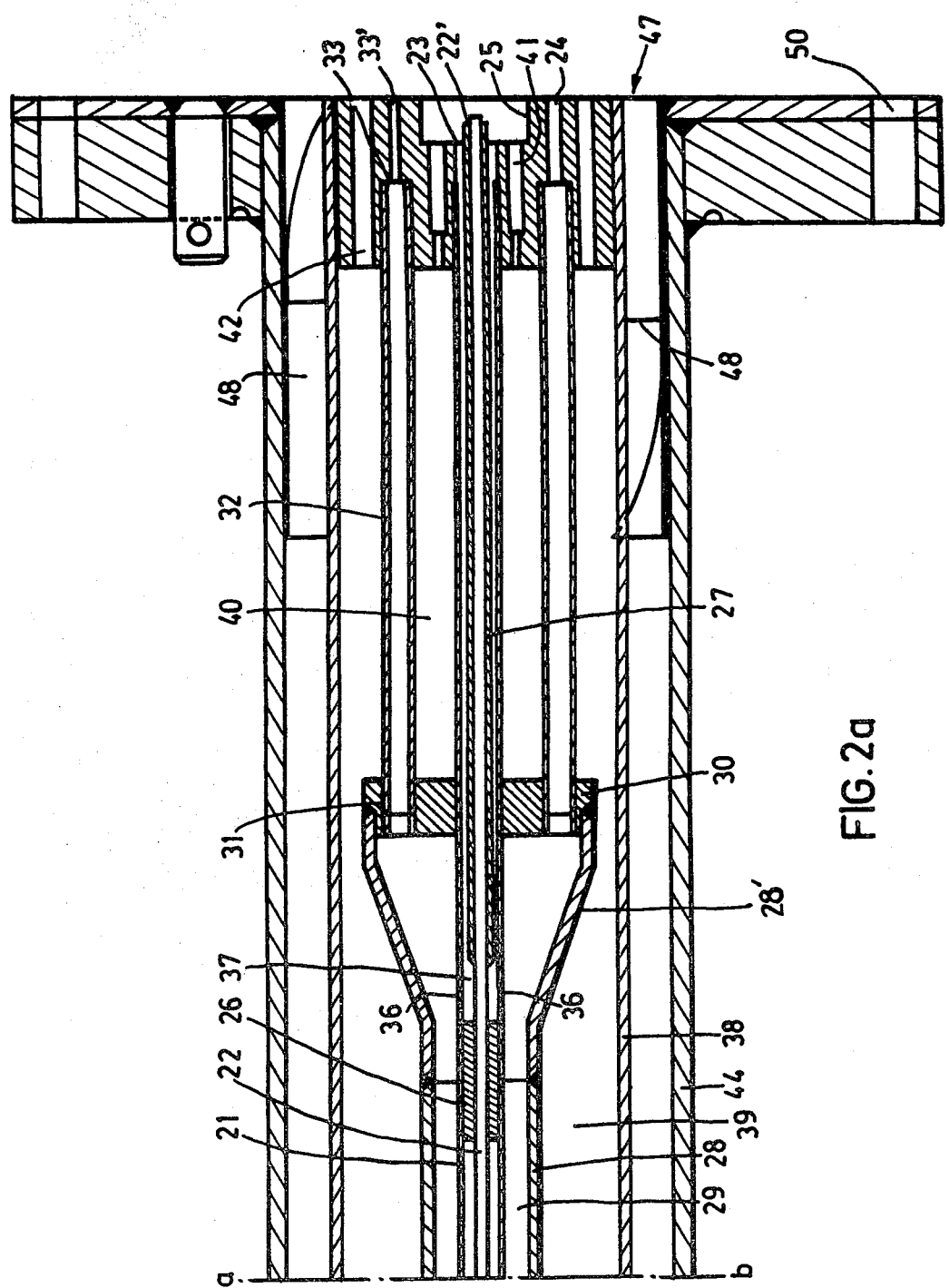

PRODUCTION OF REFRACTORY LININGS OR WALLS

BACKGROUND OF THE INVENTION

The present invention relates to the production of refractory linings or walls and has for an object a method of and apparatus for performing the sintering of refractory linings. The invention is more particularly applicable to the sintering of the linings of vessels utilised in metallurgy to contain, heat or process metals in the liquid state.

Vessels of this kind are formed from mixtures of refractory compounds in the form of compacted puddled clay tamped between the outer shell of the vessel and a metal former retaining the material at the inner side of the lining, or of hollow stacked bricks or else of a refractory coating applied by spraying on to a rigid carrier. These refractory materials are exposed to a sintering treatment which is essential to endow the refractory lining with a particular degree of mechanical strength before the first time it is used. This treatment does not have advantages only however, and the sintering conditions have a substantial bearing on the properties of the linings obtained, in particular on the service life of the walls or linings of metallurgical containers.

Commonly speaking, the refractory materials utilised in the applications of this nature are most frequently metal oxides such as silica, alumina, magnesia, zirconia, requiring sintering temperatures of the order of 1500° to 1700° C. which may as known be generated in homogenous manner in arc furnaces. The heating operation within an arc furnace is not appropriate for applications of this kind, however.

In the case of containers like metallurgical ladles and furnaces, which are intended to contain liquid metal, the prevailing trend is towards in situ sintering.

In the case of induction furnaces, this sintering action is obtained by heating by means of an air-gas burner installed in the container close to the inner surface of the linings, prior to infeed of the metal allowing of heating by induction, which may initially be cold and solid or liquefied beforehand.

In the case of ladles, this fritting action is secured by heating by means of an air-gas burner installed in the container close to the inner surface of the linings. The burners utilised do not however allow temperatures of the order of 1200° C. to be exceeded, and in all cases, it is consequently metal in the liquid state at approximately 1500° C. which is in contact with the refractory linings when the sintering action can begin; this liquid metal also originates from the melting of a non-recoverable mold or former, which melting action sets in before the onset of the sintering action as such. Because of this, it is unavoidable for liquid metal infiltrations to occur through the as yet unsintered pulverulent refractory materials.

These infiltrations certainly represent disadvantages: useless metal losses, power losses, irregular and uncertain course of the "fritting" action within the thickness of the linings, mechanical weak spots and heat bridges across the refractory material, premature attrition of the refractory material, substantial corrosion and even risks of metal leakages reaching the inductor and the cooling water ducts surrounding the containers, risks of perforations, unless a protective pulverulent layer of sufficient thickness is maintained around the sintered area. Since the sintering front forming a delimitation between these two areas progresses every time the vessel is utilised during induction heating of the liquid metal it receives, the infiltrations represent a primary factor in limiting the service life of the linings. This method also has the disadvantage that the former can never be recovered.

A more specific object of the invention is to allow the above-mentioned disadvantages to be prevented or minimised, and, contrary to the known techniques, it is possible to perform the sintering of the container linings in situ, over their inner surface prior to any contact with a liquid metal, in temperature and homogeneity conditions subsequently prevent infiltrations and restrict corrosion.

SUMMARY OF THE INVENTION

To fulfil these and other objects, the invention consists in a method for the production of refractory linings, according to which the said linings are formed from refractory material the sintering of which is at least partially performed by heating action, wherein, in order to provide said heating action, said linings are placed within an enclosure having a gas passage opening, a mixture formed from fuel gas and oxygen intended to form a heating flame is caused to pass through at least one of the said openings, the other openings serving the purpose of discharging the hot gases, and a diluting gas is injected during at least the first part of the sintering operation close to said flame in such manner as to engender a temperature increase of said refractory linings rendering it possible to reach a sintering temperature comprised between 1500° and 2000° C.

According to other features of the method, the diluting gas is air in particular: it is advantageously injected co-axially around the flame, and the temperature increase may be controlled by adjusting the intensity of the flame by action on the corresponding rates of flow of oxygen and fuel gas and on the other hand on the flow of diluting gas injected, in such manner as to raise the lining temperature homogenously in gradual manner from ambient temperature or a value of at most 500° to 1000° C., to a sintering temperature comprised between 1500° and 2000°, and preferably of the order of 1600° to 1700° C., and this temperature is maintained for a period of time.

The invention also consists in apparatus for sintering refractory linings, of the kind comprising means of shaping the said walls or linings from a refractory material and an enclosure with openings, at least one of these openings being provided with a burner, wherein the burner is a fuel gas and oxygen burner, the said enclosure being provided with means of injecting a diluting gas. The means of shutting the enclosure may in particular be formed by a cap which may be fitted on the aperture of a metal container, during application for sintering the linings of such containers on their inner surfaces.

Upon applying the invention, the injection of a diluting gas not only offers easy means of controlling the temperature by adjustment of the flow injected. It has as its result moreover that by diffusing the heat of the flame and increasing the volume of smokes, it assures a great degree of homogeniety of the heating action throughout the surface of the lining processed. Advantageously and for safety purposes, it is also possible to make use of gaseous fluids (for example air and oxygen) as burner coolants, in substitution for water.

BRIEF DESCRIPTION OF THE DRAWINGS

In order that the invention may be more clearly understood reference will now be made to the accompanying drawings which show certain embodiments of apparatus for carrying out the method according thereto and in which.

DETAILED DESCRIPTION OF PREFERRED EMBODIMENTS

Figure 1:
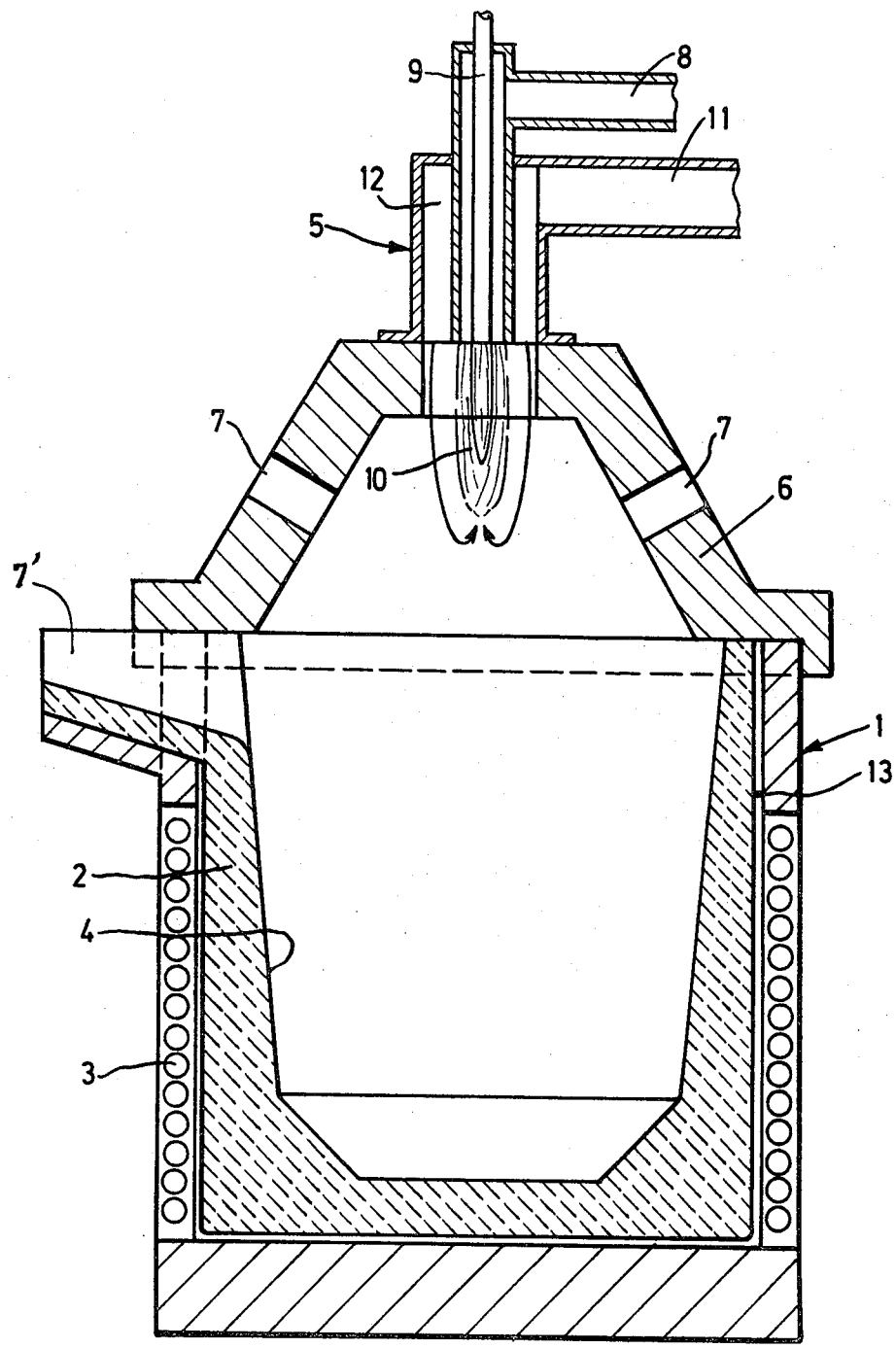
FIG. 1 is a diagrammatical view in vertical cross-section of a first embodiment of apparatus, and FIGS. 2a and 2b when joined at the line a–b illustrate in cross-section a modified embodiment of a burner.

Referring now to the drawings, according to FIG. 1, an induction furnace comprising a well or hearth 1 of generally cylindrical shape is intended to contain a metal in the liquid state, heated by an inductor 3 surrounding the furnace and cooled by the circulation of water.

A wall or lining 2 is formed by a refractory puddled clay partly sintered starting with its inner surface. It is known that the sintering front travels from the inner surface towards the outside of the furnace every time use is made of the furnace, and that the service life of the lining is a direction function of this progression. It is essential as a matter of fact that an unsintered pulverulent space be retained at the outer side of the lining to provide heat insulation and form a shield against possible infiltrations of liquid metal. The invention renders it possible to perform a first sintering operation on the linings over an appropriate depth, throughout the area of their inner surface 4, before the latter is first placed in contact with liquid metal.

This sintering operation is performed by means of apparatus which generally comprises a burner 5 installed on a removable bearing lid in the form of a cover 6 arranged to be fitted on to the furnace 1. This bearing lid has orifices 7 for outward extraction of smokes and a "nose" 7'.

The burner 5 is of the oxygen-gas type. The comburant oxygen is fed in via a pipe 8 and the fuel gas via a pipe 9 in such manner as to form a flame 10 situated within the enclosure formed by the furnace and its cover. Provision is made moreover for an annular injection around the flame of diluting air fed in via a pipe 11 leading into an annular space 12 co-axial with and outside the pipes 8 and 9.

The lining 2 of the furnace is initially formed by dry ramming of a refractory puddling clay based on silica between an outer shell or jacket 13 of the furnace, and a provisional metal former which is recoverable and retains the material at the inner side of the lining. Use may be made of conventional lining materials available commercially, which commonly contain 1.2% of boric acid, but it is preferred to select lining materials having a low proportion of mineralising elements, say for example a siliceous fireclay or lining material containing 0.3 to 0.9% of boric acid or its equivalent in boron or boric anhydride, that is a lining material free of mineralising elements.

The metal former (not shown in the Figure) is commonly extracted after a preliminary heating action has assured cohesion of the lining material thanks to an organic binder or by the mineralising element it may contain. This preliminary heating action itself may be performed by means of the same equipment as that used for the sintering operation. The former may also be withdrawn before any heating action is performed.

The combination of the oxygen-gas burner with the co-axial annular injection of air renders it possible to control the temperature of the refractory lining at the side of its inner surface to provide gradual heating according to a course controlled precisely from practically ambient temperature to the sintering temperature, even if the latter should be high, for example 1900° C. for particular products.

The temperature is raised at the rate of 100° C. to 200° C. per hour, the former is withdrawn at 400° C. and the temperature is raised to the sintering level at the hourly rate of 100° C. to 200° C. and, at the sintering temperature, a level of 1550°–1650° C. or more is maintained for an hour before allowing the lining to cool. It is also possible moreover to control the temperature drop and to keep the burner in operation to keep the furnace at high temperature until metal is fed in. A temperature level of one or two hours is preferably maintained at a temperature of the order of 500° C.

By way of example, for a siliceous lining material, a sintering temperature of 1550° C. was reached in 17½ hours at the rate of 100° C. per hour, with a 2-hour stage at 500° C. and a 2-hour stage at 1550° C. For a siliceous lining material, the sintering temperature of 1550° C. was reached in 11½ hours at the rate of 150° C./hour, with an hour's stage at 500° C. and an hour's stage at 1550° C. For an aluminous lining material, the temperature of 500° C. was reached at the rate of 150° C./hour, followed by an hour's stage at 500° C., the temperature then being raised at a rate comprised between 200° C./hour and 250° C./hour, and an hour's stage was maintained at 1650° C. in any event.

Throughout the heating period, the intensity of the flame was controlled by means of the rates of flow of fuel gas and oxygen fed to the burner. Furthermore, the correlative rates of flow are always adjusted so that the combustion always occurs with an oxidising flame, to prevent a reduction of the refractory material. For as long as air is injected at the same time around the burner, the flame 10 heats this air and a hot-air generator is produced within the furnace in this manner, within the partially shut enclosure, with a controllable and homogenous air temperature.

The evenness of the heating action on the linings which are to be sintered is assured by means of this injection of air during a first part of the temperature rise, for example up to 1100° C. Beyond this temperature, the injection of air is stopped whilst continuing to control the flame intensity to adhere to the temperature rise program. During this second heating stage, the evenness of the temperature at the surface of the lining which is to be sintered is assured by the radiation from the refractory material. The temperature of the lining may be measured by means of a thermoelectric chromelalumel couple placed against the lining up to 1100° C., and by means of an optical pyrometer beyond this level.

The method applied renders it possible to assure sintering the lining on its inner surface, and thus to provide mechanical strength and pore closure, prior to any contact with liquid metal. The elimination of the risks of infiltration considerably increases the service life of the linings. For example, it was observed in the case of induction furnaces, that power reductions of 20% to 30% were possible. The precision of temperature control and its homogenous nature render it possible to provide a high mechanical strength and surface resistance against thermal shocks and corrosion, more satisfactorily than by existing techniques. Analysis of the sintered refractory material demonstrates the absence of a vitreous phase and a total conversion of quartz into crystobalite. The quality of the surface-sintered lining is equally demonstrated by porosity readings yielding the following results:

| Distance from the inner surface | 0 to 1 cm | 1 to 2 cms | 3.5 to 4.5 cms |
|---|---|---|---|
| Total porosity | 12.9% | 20.1% | 20.8% |
| of which | | | |
| radius >7.5 microns | 45% | 84% | 63% |
| radius <7.5 microns | 55% | 16% | 37% |

The low total porosity throughout the sintered layer, and above all the low proportion of macropores at the locus of the sintering front, will be observed.

Figure 2B:
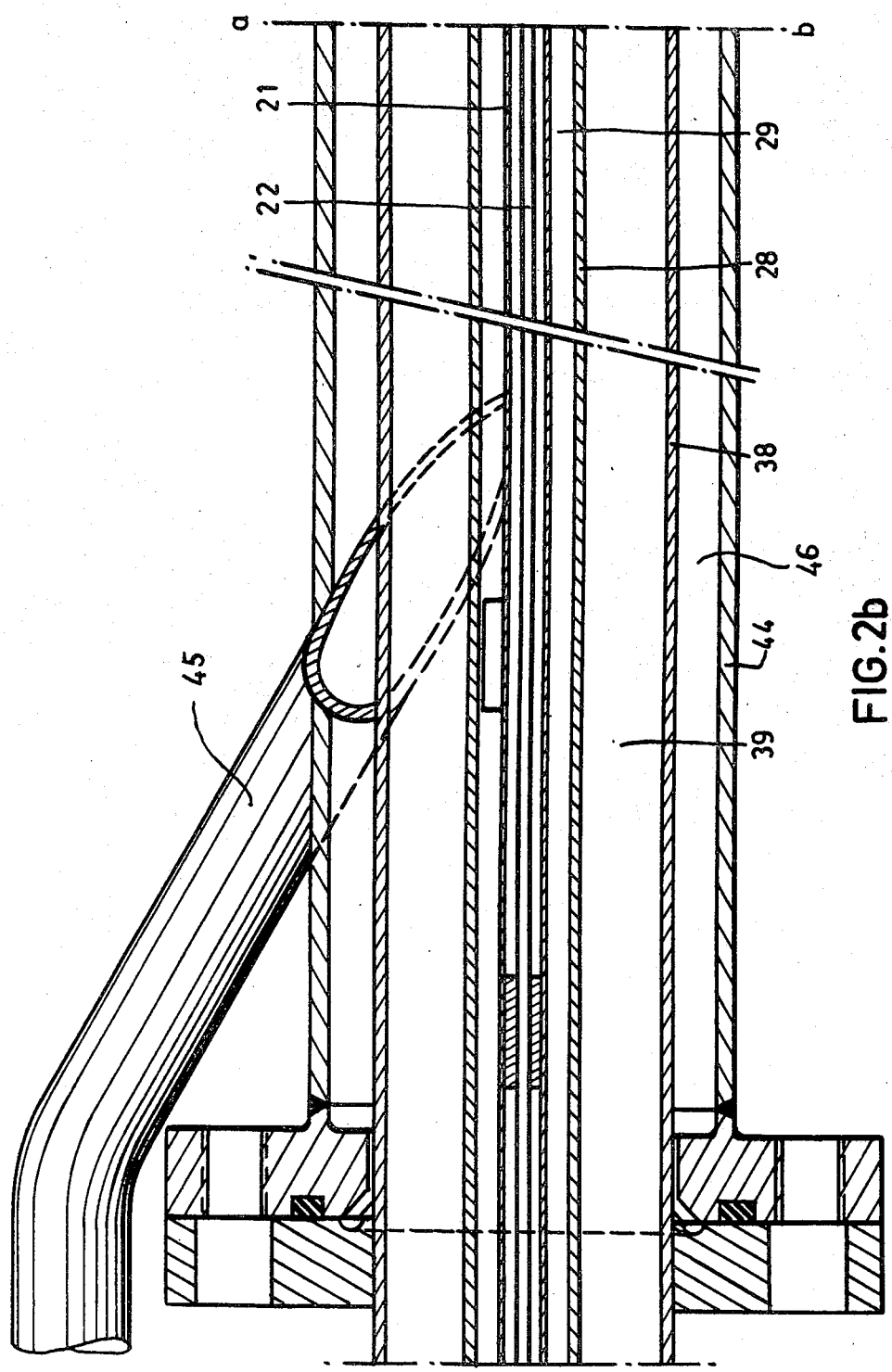

With reference to both FIGS. 2a and 2b, a sintering burner comprises:

a central tube 21 in which is fitted an ignition electrode 22, the tube 21 being connected to an axial passage 23 of a massive element forming a burner nozzle 24, the passage 23 itself opening into a central recess 25 of the burner nozzle 24. The ignition electrode 22 is fitted in the tube 21 via bearer rings 26 and its terminal portion is surrounded by an aluminium tube 27. Its free end 22' protrudes into the central recess 25.

a second tube 28 co-axial with the central tube 21 which with the latter forms a principal annular duct 29 for a fuel gas, this tube 28 being flared at its front end 28' for connection to a transverse plate 30 having a plurality of annularly-arranged perforations 31 acting as a carrier for a ring of distributor tubes 32 which at their other ends are engaged in perforations 33 of the burner nozzle 24; these perforations 33 open to the outside via calibrated bores 33'. The tube 28 has connected to it an extremity opposed to the nozzle 24, a fuel gas supply tube which is not shown; in the central duct 21 are formed several perforations 36 establishing communication between the annular duct 29 and the axial duct 37 formed by the tube 21 for transfer of fuel gas for the pilot light or for ignition.

a third tube 38 is situated co-axially at the outside of the second tube 28 and is engaged on the outer periphery of the burner nozzle 24. At an end distant from the burner nozzle, this tube 38 has connected to it an oxygen supply tube which is not illustrated, which thus, with the second tube 28, forms an annular oxygen duct 39 leading into a distribution chamber 40 delimited between the transverse plate 30 and the nozzle 24 and through which extend the terminal portion of the axial duct 21 and the annular array of tubes 32. This distribution chamber 40 opens at the outside into a first ring of narrow transverse passages 41 situated around and close to the axial passage 23, in such manner that for their part they open into the recess 25, and into a second ring of wide transverse passages 42 extending externally around and at a small distance from the ring of passages 33-33'.

a fourth tube 44 is placed co-axially around and at a distance from the third tube 38, is connected on the one hand to two air feed tubes 45 (of which one only is apparent in the drawing) the ends of which for connection to the tube 44 slope in a substantially tangential directional setting to impart a vortexial motion to the air immediately upon entering an annular duct 46 formed between the tubes 38 and 44. The tube 44 is secured around the extremity of the duct 24 by means of a ring 47 of vanes 48 which intensify the whirling action previously initiated by the directional setting of the tubes 45.

The whole thus described is fitted in a flange 50 which is secured on the burner support wall. During operation, an igniting flame is permanently formed in the recess 25 by combustion of the gas fed into the duct 37 of the tube 21 via the perforations 36 and originating from the principal fuel gas duct 39, this igniting flame itself being constantly exposed to the electrical discharges of the igniting electrode 22; the principal flame of the burner is formed around the igniting flame by combustion of the gas carried by the tubes 32 and the perforations 33-33' into the oxygen carried by the wide transverse passages 42. When air is set in motion in the duct 46, it issues around the principal flame in a whirling motion as stated earlier, which has the result of slowing down the axial speed of the principal flame and apart from the required diluting action, as to endow the flame with a more contact form more appropriate for the sintering operation.

It will be apparent that the invention is not limited to the example of application which has been described in particular in the foregoing. The method may be applied in analogous manner for in situ sintering of other refractory containers, for sintering lining materials applied by spraying to repair casting ladles or other containers, but also for sintering raw bricks or monolithic blocks for replacement of faulty refractory materials, and so on.

I claim:

1. A method for the production of refractory linings, according to which said linings are formed from refractory lining material the sintering of which is at least partially performed by heating action, wherein, in order to provide said heating action, said method comprises the steps of placing said linings within an enclosure having a gas-passage opening and at least one other opening;

passing through said gas-passage opening a mixture formed from fuel gas and oxygen to form a heating flame, with at least said one other opening serving to permit discharge of hot gasses resulting from combustion of said mixture; and injecting a diluting gas into said enclosure close to said flame during at least a first part of the sintering of the refractory material in such a manner as to increase the temperature of said linings to a sintering temperature in the range of 1500° C. to 2000° C.

2. A method according to claim 1, wherein the step of injecting a diluting gas includes injecting said diluting gas coaxially around said flame.

3. A method according to claim 1 or 2, further comprising controlling the intensity of the flame and the rate of delivery of the diluting gas in such manner that the temperature of the refractory linings is raised gradually from an initial temperature lying between ambient temperature and a maximum initial temperature between 500° C. and 1000° C., up to a sintering temperature between 1500° C. and 2000° C.; and maintaining said sintering temperature for a maintenance period.

4. A method according to claim 3, wherein said sintering temperature is between 1550° C. and 1650° C.

5. A method according to claim 1 or 2, wherein said step of injecting the diluting gas includes injecting the diluting gas only during an initial part of the heating action, up until the temperature is approximately 1100° C.

6. A method according to claim 1, wherein said diluting gas is air.

7. A method according to claim 1, wherein said material forming the linings is a refractory lining material having a proportion below about 1.2% of mineralising elements.

8. A method according to claim 1, further comprising initially shaping the lining material in metal former means, and extracting said former means at the latest when the temperature has risen to approximately 400° C.

9. A method according to claim 8, wherein said former means is extracted prior to any rise in temperature.

10. A method for the production of refractory linings, according to which said linings are formed from refractory lining material the sintering of which is at least partially performed by heating action, wherein, in order to provide said heating action, said method comprises the steps of
placing said linings within an enclosure having a gas-passage opening and at least one other opening;
passing through said gas-passage opening a mixture formed from fuel gas and oxygen to form a heating flame, with at least said one other opening serving to permit discharge of hot gasses resulting from combustion of said mixture; and
injecting a diluting gas into said enclosure close to said flame during at least a first part of the sintering of the refractory material in such a manner as to increase the temperature of said linings to a sintering temperature in the range of 1500° C. to 2000° C., wherein said injecting of the diluting gas ceases at a temperature of the order of 1000° C. to 1200° C.

11. A method according to claim 1, further comprising maintaining said sintering temperature for a maintenance period of at least one hour.

12. A method according to claim 3, wherein said maintenance period is at least one hour.

13. A method for the production of refractory linings, according to which said linings are formed from refractory lining material the sintering of which is at least partially performed by heating action, wherein, in order to provide said heating action, said method comprises the steps of
placing said linings within an enclosure having a gas-passage opening and at least one other opening;
passing through said gas-passage opening a mixture formed from fuel gas and oxygen to form a heating flame, with at least said one other opening serving to permit discharge of hot gasses resulting from combustion of said mixture;
injecting a diluting gas into said enclosure close to said flame during at least a first part of the sintering of the refractory material in such a manner as to increase the temperature of said linings to a sintering temperature in the range of 1500° C. to 2000° C.; and
maintaining a temperature of the order 500° C. for a temperature maintenance period of 1 to 2 hours after reducing the temperature from said sintering temperature.

14. A method for the production of refractory linings, according to which said linings are formed from refractory lining material the sintering of which is at least partially performed by heating action, wherein, in order to provide said heating action, said method comprises the steps of
placing said linings within an enclosure having a gas-passage opening and at least one other opening;
passing through said gas-passage opening a mixture formed from fuel gas and oxygen to form a heating flame, with at least said one other opening serving to permit discharge of hot gasses resulting from combustion of said mixture; and
injecting a diluting gas into said enclosure close to said flame during at least a first part of the sintering of the refractory material in such a manner as to increase the temperature of said linings, wherein the increase of temperature of the linings is controlled to occur at a rate on the order of 100° C./hour to 250° C./hour, to a sintering temperature in the range of 1500° C. to 2000° C.

15. A method according to claim 14, wherein, for the purpose of sintering aluminous refractory lining material, said increase of temperature is at a first, slower rate until a temperature of the order of 500° C. is reached; the temperature is maintained at such temperature for a maintenance period; and the increase of temperature is at a second, faster rate after said maintenance period.

16. Apparatus for production of refractory linings in which the linings are formed from refractory lining material the sintering of which is at least partially performed by heating action, comprising shaping means for shaping said linings from said refractory material; enclosure means in which said refractory lining is placed and having a gas-passage opening and at least one other opening; with said gas-passage opening being provided with burner means, wherein said burner means includes a fuel gas and oxygen burner and means feeding a fuel gas and oxygen mixture thereto so that said burner forms a heating flame from said fuel gas and oxygen mixture, with said at least one other opening serving to permit discharge of hot gasses resulting from combustion of said mixture; and wherein said enclosure means further includes gas-injecting means for injecting a diluting gas, wherein said gas-injecting means injects said diluting gas into said enclosure close to said flame during at least an initial part of the sintering of the refractory material in such a manner as to permit the increase of the temperature of said linings to a sintering temperature in the range of 1500° C. to 2000° C., said gas-injecting means being coaxially arranged around said burner.

17. Apparatus for production of refractory linings in which the linings are formed from refractory lining material the sintering of which is at least partially performed by heating action, comprising shaping means for shaping said linings from said refractory material; enclosure means in which said refractory lining is placed and having a gas-passage opening and at least one other opening; with said gas-passage opening being provided with burner means, wherein said burner means includes a fuel gas and oxygen burner and means feeding a fuel gas and oxygen mixture thereto so that said burner forms a heating flame from said fuel gas and oxygn mixture, with said at least one other opening serving to permit discharge of hot gasses resulting from combustion of said mixture; and wherein said enclosure means further includes gas-injecting means for injecting a diluting gas, wherein said gas-injecting means injects said diluting gas into said enclosure close to said flame during at least an initial part of the sintering of the refractory material in such a manner as to permit the increase of the temperature of said linings to a sintering temperature in the range of 1500° to 2000° C.; wherein at least a part of said enclosure means forms structure for shaping said refractory linings.

18. Apparatus according to claim 17, wherein said enclosure means is of two-part construction including a lower part serving as structure for shaping the refractory linings and a removable upper part in the form of a cover fittable on said lower part.

19. Apparatus for production of refractory linings in which the linings are formed from refractory lining material the sintering of which is at least partially performed by heating action, comprising shaping means for shaping said linings from said refractory material; enclosure means in which said refractory lining is placed and having a gas-passage opening and at least one other opening; with said gas-passage opening being provided with burner means, wherein said burner means includes a fuel gas and oxygen burner and means feeding a fuel gas and oxygen mixture thereto so that said burner forms a heating flame from said fuel gas and oxygen mixture, with said at least one other opening serving to permit discharge of hot gasses resulting from combustion of said mixture; and wherein said enclosure means further includes gas-injecting means for injecting a diluting gas, wherein said gas-injecting means injects said diluting gas into said enclosure close to said flame during at least an initial part of the sintering of the refractory material in such a manner as to permit the increase of the temperature of said linings to a sintering temperature in the range of 1500° C. to 2000° C.; wherein said gas-injecting means includes a diluting gas feed duct having an outlet feeding the gas into said enclosure means and means imparting a whirling motion to the injected diluting gas.

20. Apparatus according to claim 19, wherein said means imparting a whirling motion includes a plurality of vanes abreast of said outlet.

21. A method according to claim 3, wherein the gradual raising of temperature is carried out at a rate of 100° C. to 200° C. per hour.

22. A method according to claim 7, wherein said material forming the linings contains 0.3% to 0.9% boric acid or its equivalent in boron or boric anhydride.

* * * * *